(12) United States Patent
Robeson

(10) Patent No.: US 6,341,635 B1
(45) Date of Patent: Jan. 29, 2002

(54) TRACTION DEVICE FOR A WHEELED VEHICLE

(75) Inventor: Palmer Edward Robeson, McLean, VA (US)

(73) Assignee: Emergency Traction Device, LLC, McLean, VA (US)

(*) Notice: Subject to any disclaimer, the term of this patent is extended or adjusted under 35 U.S.C. 154(b) by 0 days.

(21) Appl. No.: 09/516,929

(22) Filed: Mar. 1, 2000

Related U.S. Application Data

(60) Provisional application No. 60/158,371, filed on Oct. 12, 1999.

(51) Int. Cl.[7] ............................................. B60C 11/00
(52) U.S. Cl. .................... 152/225 R; 152/210; 152/218
(58) Field of Search ............................ 152/225 R, 216, 152/218, 213 R, 217; 301/41.1, 42, 43, 44.1, 45, 46, 51

(56) References Cited

U.S. PATENT DOCUMENTS

| | | | |
|---|---|---|---|
| 1,327,538 A | 1/1920 | Etter | 152/218 |
| 2,212,076 A | 8/1940 | Rollings | 152/216 |
| 2,343,131 A | 2/1944 | Austin | 152/228 |
| 2,397,277 A | 3/1946 | Lawrence | 152/218 |
| 2,423,759 A | 7/1947 | Edwards | 152/225 |
| 2,434,017 A | 1/1948 | Snedeker | 152/213 |
| 2,453,273 A | 11/1948 | Scott | 152/225 |
| 2,456,544 A | 12/1948 | Varner | 152/225 |
| 2,598,298 A | 5/1952 | Pindjak | 152/225 |
| 2,640,522 A | 6/1953 | Schroen | 152/228 |
| 2,873,783 A | 2/1959 | O'Higgins | 152/225 |
| 2,910,105 A | 10/1959 | Binegar | 152/225 |
| 2,981,303 A | 4/1961 | Hayes | 152/228 |
| 3,019,830 A | 2/1962 | Shelby | 152/225 |
| 3,053,302 A | 9/1962 | Bopst, III | 152/226 |
| 3,112,784 A | 12/1963 | Montenare | 152/216 |
| 3,249,143 A | 5/1966 | Scott | 152/225 |
| 3,547,176 A | 12/1970 | Kroken et al. | 152/218 |
| 3,736,970 A | 6/1973 | Clark | 152/226 |
| 3,847,196 A | 11/1974 | Gomez | 152/226 |
| 3,891,018 A | 6/1975 | Hyggen | 152/225 |
| 4,089,359 A | 5/1978 | Jones | 152/218 |
| 4,098,314 A | 7/1978 | Welsh | 152/216 |
| 4,122,880 A | 10/1978 | Hyggen | 152/216 |
| 4,180,115 A | 12/1979 | Yamagishi | 152/225 |
| 4,209,049 A | 6/1980 | Regensburger | 152/216 |
| 4,549,591 A | 10/1985 | Hyggen | 152/218 |
| 4,735,248 A | 4/1988 | Cizaire | 152/218 |
| 4,747,438 A | 5/1988 | Joung | 152/218 |
| 4,862,936 A | 9/1989 | McDonough | 152/216 |
| 4,886,100 A | 12/1989 | Parker, III | 152/219 |
| 4,974,653 A | 12/1990 | Zelent | 152/216 |
| 5,254,187 A | 10/1993 | Metraux | 152/216 |
| 5,513,684 A | 5/1996 | Laub | 152/216 |
| 5,735,980 A | 4/1998 | Robeson | 152/216 |
| 6,053,227 A | 4/2000 | Robeson | 152/225 |

FOREIGN PATENT DOCUMENTS

| | | | |
|---|---|---|---|
| DE | 33 47566 A1 | 8/1984 | 152/225 |

*Primary Examiner*—S. Joseph Morano
*Assistant Examiner*—Long Bao Nguyen
(74) *Attorney, Agent, or Firm*—Morgan, Lewis & Bockius LLP

(57) ABSTRACT

The present disclosure concerns an emergency traction device that may be easily and securely fitted on vehicles having tires of different diameters and widths. A single winch sizes and secures the traction device for the proper tire diameter and then for the proper tire width. Traction can be further enhanced with members that substantially circumscribe the tire. Operation of the traction device can be enhanced by providing nonreversible gearing for operating the winch.

5 Claims, 8 Drawing Sheets

TRACTION DEVICE FOR A WHEELED VEHICLE

CROSS REFERENCE TO RELATED APPLICATION

This application claims the benefit of priority based on U.S. Pat. No. 6,053,227, filed Mar. 1, 1999, and claims the benefit of the earlier filing date of U.S. Provisional Application 60/158,371, filed Oct. 12, 1999.

BACKGROUND OF THE INVENTION

The invention concerns a traction device for vehicles having at least one ground engaging tire. In particular, the invention is directed to an emergency traction device that is readily fitted to tires of various diameters and widths. Additionally, the present invention is directed to an enhanced emergency traction device that substantially circumscribes a tire.

Known traction devices include snow tires, studded tires, and tire chains. The use of snow or studded tires requires that the vehicle operator anticipate the occurrence of inclement weather and replace the ordinary tires with the snow or studded tires. Consequently, two sets of tires are required which must either be alternately mounted on one set of vehicle wheels, or a second set of wheels must be obtained. Disadvantages of snow or studded tires include the cost of changing multiple set of wheels and/or tires, and the inability to react to unexpected weather.

Tire chains are commonly installed on the ordinary tires of a vehicle to enable an operator to react to, rather than anticipate, inclement whether. The disadvantages of tire chains include the need to have a set of chains sized to fit the particular tires of a vehicle, and the possibility of a chain being "thrown-off" a rotating wheel damaging the vehicle body.

Further, tire chains are generally installed by driving a tire onto the chain and subsequently linking the chain around the circumference of the tire. In the event the vehicle is already stuck, i.e. the tire spins without gaining traction, it is not possible to install the chains which could free the vehicle without elevating the tire off the ground.

U.S. Pat. No. 5,735,980 to Robeson discloses an emergency traction device in which the mechanisms for fitting the device to the diameter and width of the wheel each include a separate winch.

Other types of device intended to be attached to the tires and/or wheels of vehicles for the purpose of improving traction are described in the United States Patents to Laub U.S. Pat. No. 5,513,684, Metraux U.S. Pat. No. 5,254,187, Zelent U.S. Pat. No. 4,974,653, Parker, III U.S. Pat. No. 4,886,100, McDonough U.S. Pat. No. 4,862,936, Regensburger U.S. Pat. No. 4,209,049, Hyggen U.S. Pat. No. 4,122,880 and U.S. Pat. No. 3,891,018, Welsh U.S. Pat. No. 4,098,314, Gomez U.S. Pat. No. 3,847,196, Clark U.S. Pat. No. 3,736,970, Scott U.S. Pat. No. 3,249,143, Bopst III U.S. Pat. No. 3,053,302, Hayes U.S. Pat. No. 2,981,303, Binegar U.S. Pat. No. 2,910,105, Schroen U.S. Pat. No. 2,640,522, Pindjak U.S. Pat. No. 2,598,298, and Edwards U.S. Pat. No. 2,423,759. In general, these patents disclose traction devices having a plurality of arms extending outward toward the tread surface of the tire.

SUMMARY OF THE INVENTION

An object of the present invention is to provide an emergency traction device for attachment to a vehicle tire that is conveniently stored, easily adapted to tires of different diameters and widths, and is uniformly and securely installed.

Another object of the present invention is to provide an emergency traction device that may be readily installed and removed under any circumstances and terrain conditions.

Yet another object of the present invention is to provide an emergency traction device which is immediately transferable between alternate vehicles having different size tires.

A further object of the present invention is to provide an emergency traction device in which a single mechanism is used for fitting the device first to the diameter and then to the width of the wheel.

Yet a further object of the present invention is to provide an emergency traction device including additional traction devices overlying portions of the tread around a majority of a tire's circumference.

These objects, as well as additional objects and advantages of the present invention that will be apparent from the following description, are achieved according to a traction device for attachment with respect to a tire rotating on an axis, wherein the tire has a terrain engaging surface connecting a pair of sidewalls. The traction device comprises a plurality of arms adapted to extend radially with respect to the axis, each of the plurality of arms including a first section adapted to be radially extensible with respect the terrain engaging surface and a second section adapted to be extensible across the terrain engaging surface, each of the plurality of second sections being mounted at a radially outward end of a corresponding one of the plurality of first sections; a plurality of fingers adapted to engage one of the pair of sidewalls, each of the plurality of second sections extensibly connecting a corresponding one of the plurality of first sections and a corresponding one of the plurality of fingers; a winch including a cable drum and a plurality of cables, each of the plurality of cables extending from a corresponding one of the plurality of fingers, along corresponding ones of the first and second sections, to the cable drum; a plurality of first springs each expanding a corresponding one of the first sections; and a plurality of second springs each expanding a corresponding one of the second sections. Each of the first springs has a lower spring constant than a corresponding one of the plurality of second springs.

DESCRIPTION OF THE PREFERRED EMBODIMENTS

Figure 1:
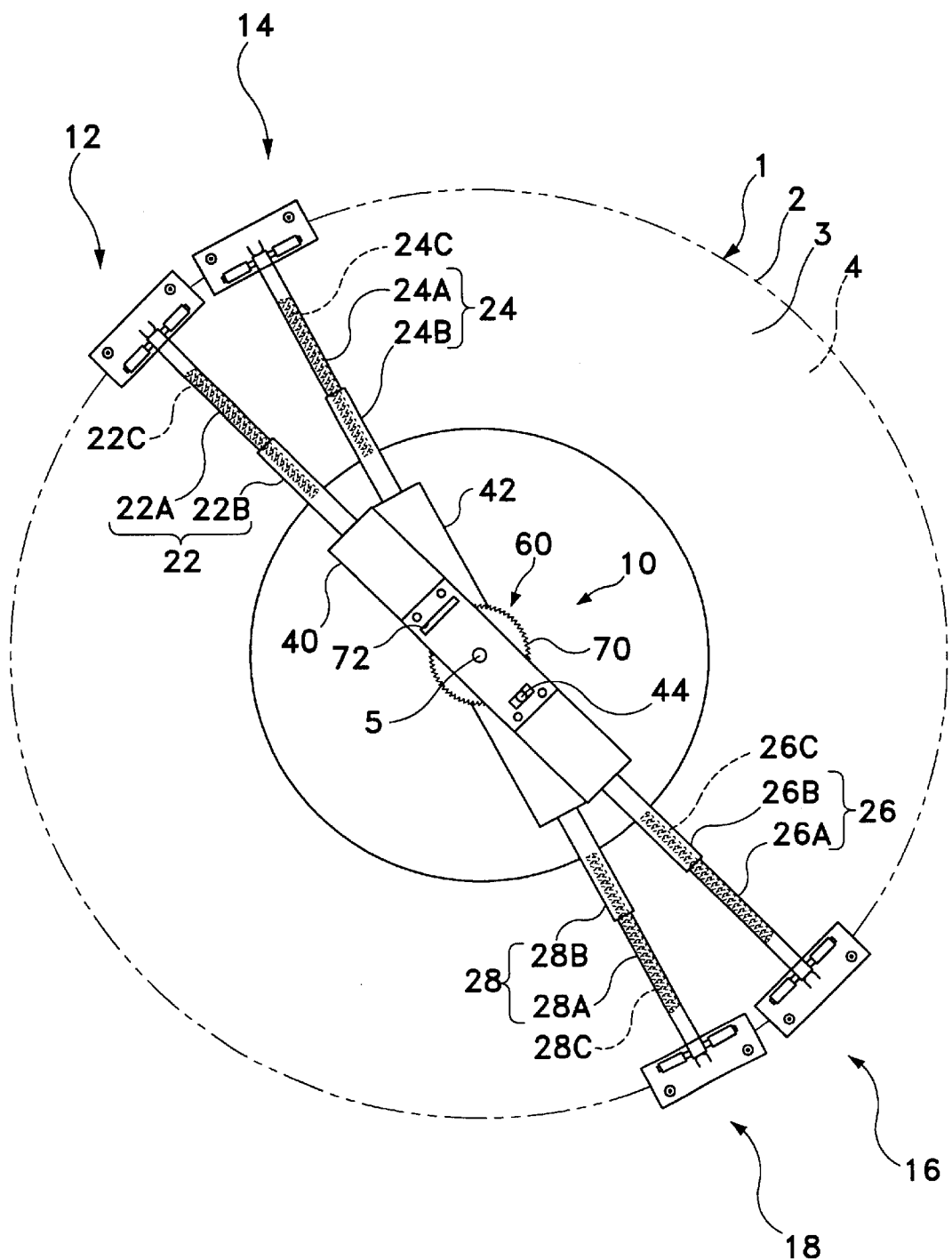
FIG. 1 is a front view of a traction device according to a first preferred embodiment of the present invention shown in a collapsed state.
Figure 2:
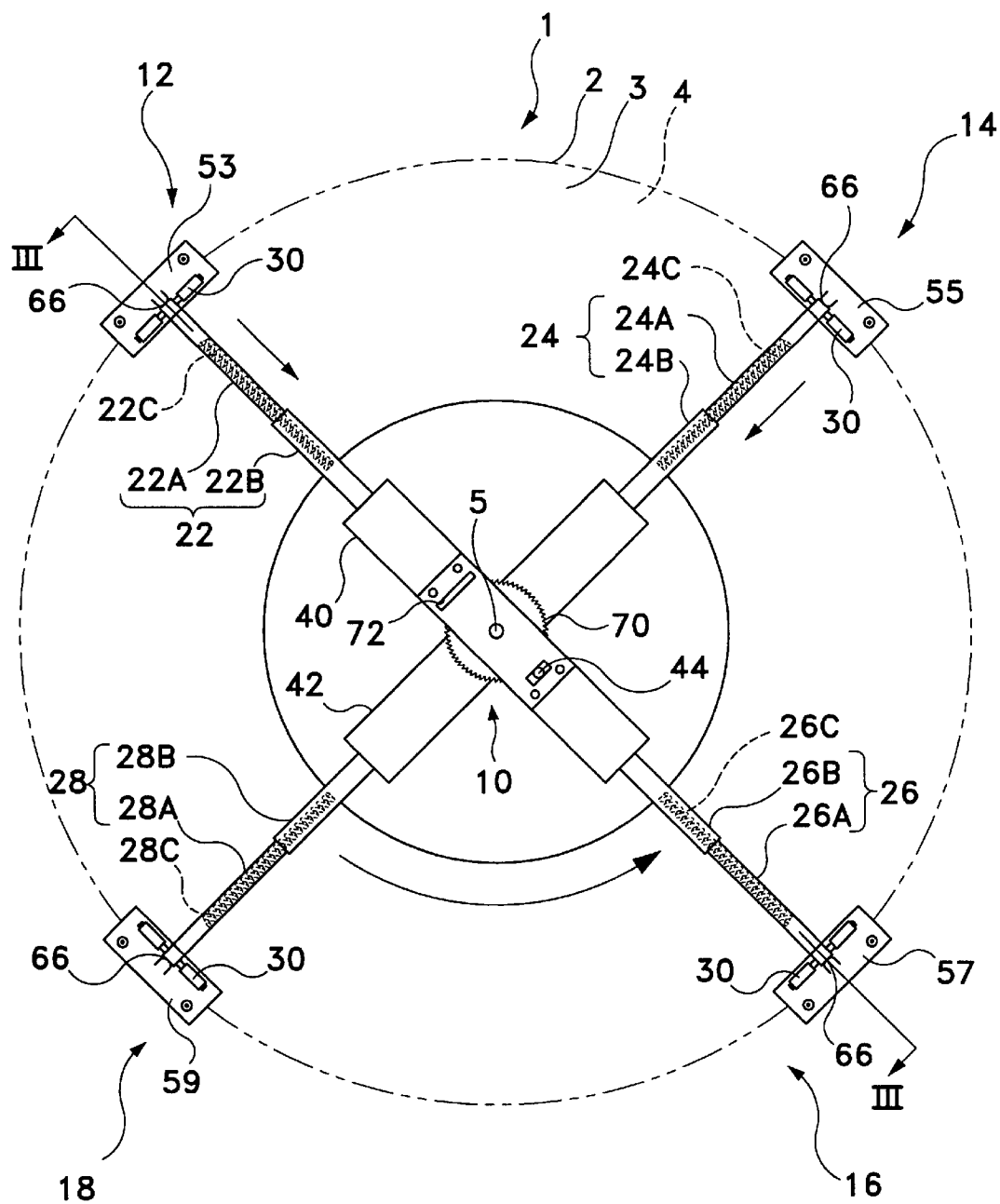
FIG. 2 is a front view of the traction device according to the first preferred embodiment of the present invention shown in an installed state.
Figure 3:
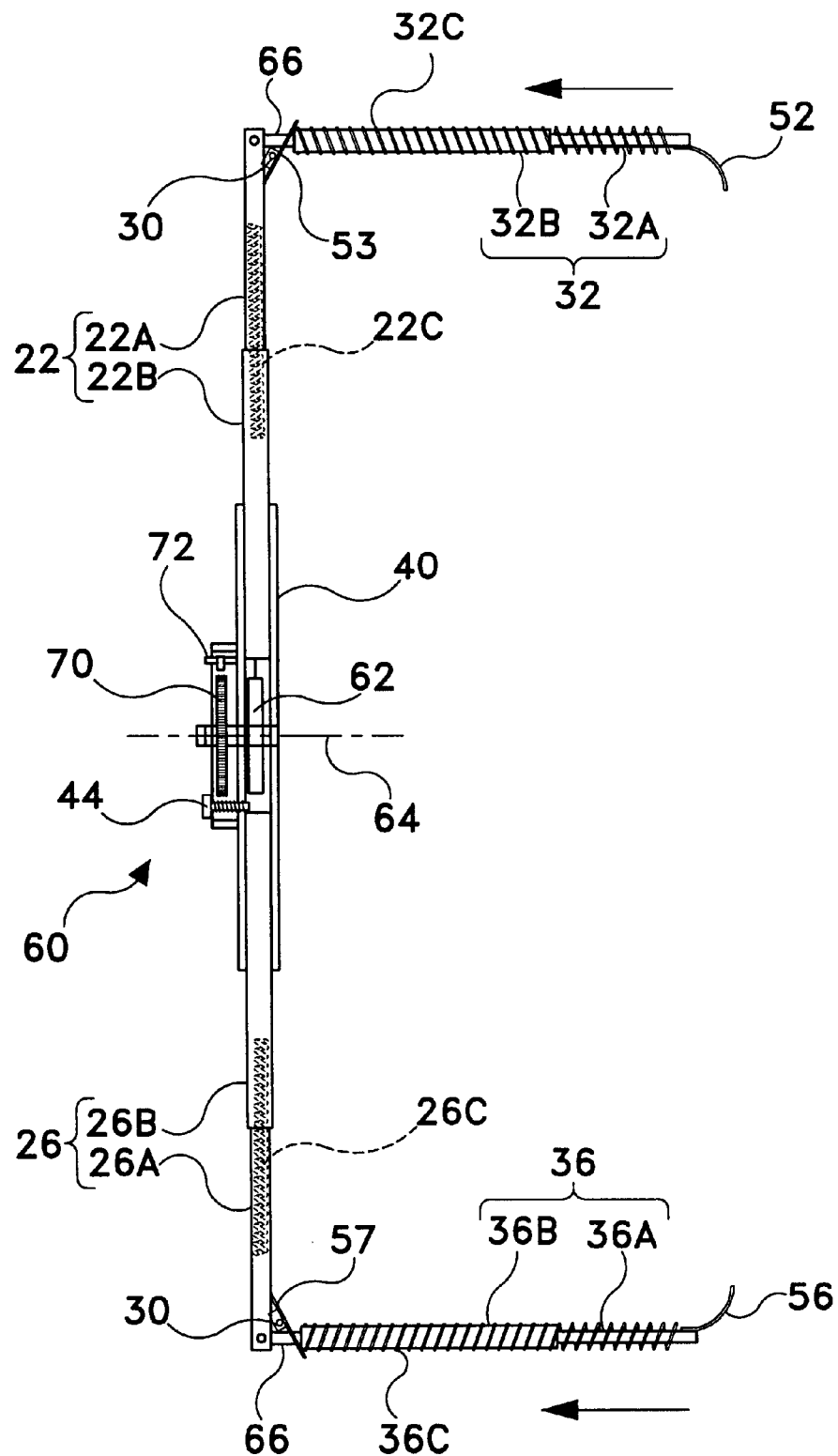
FIG. 3 is a cross-section view taken along line III—III in FIG. 2 of a traction device according to the first preferred embodiment of the present invention shown in an installed state.

Referring to FIGS. 1–3, a traction device 10 is shown with respect to a tire 1. Tire 1 includes a terrain engaging tread surface 2 and two sidewalls 3,4 connected by the tread 2 in a known arrangement.

Traction device 10 includes a plurality of arms 12,14,16, 18 extending radially outward toward the tread 2. Although four arms are illustrated, it is understood the present invention may include more or less than four arms. However, at least two arms must be present, and at least three arms or an even multiple of arms are preferable.

Each arm 12,14,16,18 includes a corresponding first extensible section 22,24,26,28 such that the traction device can be made to accommodate tires of varying diameters. Each first extensible section 22,24,26,28 includes a corresponding hollow rod 22A,24A,26A,28A that is telescopically slidable within a corresponding tube 22B,24B,26B, 28B. Two telescopically related components A,B for each arm 12,14,16,18 are illustrated for the purposes of describing the present invention; however, more than two telescopic components are also possible. Preferably, the telescopic components A,B have cross-sections that prevent relative rotation along the length of the arms 12,14,16,18.

Each first extensible section 22,24,26,28 further includes a corresponding first resilient biasing element 22C,24C,26C, 28C, e.g. a coil spring, causing relative expansion of the telescopic components A,B. According to a preferred embodiment of the present invention, the first resilient biasing elements 22C,24C,26C,28C are enclosed by and extend within the telescopic components A,B of the first extensible sections 22,24,26,28.

According to a preferred embodiment, a first group of the arms 12,16 are fixed at their radially proximal end to a first support plate 40, and a second group of the arms 14,18 are fixed at their radially proximal end to a second support plate 42. First and second support plates 40,42 are relatively pivotal about a central point substantially coincident with the axis of rotation 5 for the tire 1. In the collapsed position of the traction device 10 (FIG. 1), first and second support plates 40,42 are relatively pivoted such that arms 12 and 14, as well as arms 16 and 18, are clustered together. After positioning the traction device 10 with respect to tire 1, the first and second support plates 40,42 are relatively pivoted to equiangularly dispose the arms 12,14,16,18 around the tire rotation axis 5 (FIG. 2). A lock mechanism 44 maintains the relative position of the first and second support plates 40,42.

A corresponding second extensible section 32,34,36,38 is mounted at the radially distal end of each arm 12,14,16,18. According to a preferred embodiment of the present invention, each of the second extensible sections 32,34,36, 38 is mounted with respect to their corresponding first extensible sections 22,24,26,28 by a hinge joint 30 that enables the traction device 10 to be further collapsed for storage. It is envisioned that one or more detents can be used to restrain pivoting about the hinge joint 30. A first detent can be used to resist movement away from the folded position of the second extensible section with respect to the corresponding first extensible section, thereby eliminating the need to provide any other means, e.g., a strap, for holding the traction device 10 in its fully collapsed position. A second detent can be used to resist movement away from the perpendicularly extending arrangement of the second extensible section with respect to the corresponding first extensible section, thereby facilitating placing the traction device 10 around a tire.

Each second extensible section 32,34,36,38 includes a corresponding finger 52,54,56,58 engaging the inner sidewall 4 of the tire 1. According to a preferred embodiment of the present invention, plates 53,55,57,59 may engage the outer sidewall 3 of the tire 1. Each of the second extensible sections 32,34,36,38 is interposed between corresponding ones of the fingers 52,54,56,58 and either the first extensible sections 22,24,26,28 or the plates 53,55,57,59. According to a preferred embodiment of the present invention, each second extensible section 32,34,36,38 includes a rod 32A, 34A,36A,38A telescopically related to a tube 32B,34B,36B, 38B such that each second extensible section 32,34,36,38 accommodates tires of varying widths. Although two telescopic components A,B for each second extensible section 32,34,36,38 are illustrated for the purposes of describing the present invention, more than two telescopic components are also possible.

Each second extensible section 32,34,36,38 further includes a second resilient biasing element 32C,34C,36C, 38C, e.g. a coil spring, causing relative expansion between corresponding ones of the fingers 52,54,56,58 and either the first extensible sections 52,54,56,58 or the plates 53,55,57, 59. According to a preferred embodiment of the present invention, the second resilient biasing elements 32C,34C, 36C,38C surround and extend along the second extensible sections 32,34,36,38 to enhance the relative traction between both the tire 1 and second extensible section 32,34,36,38, as well as between second extensible section 32,34,36,38 and the terrain. Further, second resilient biasing elements 32C,34C,36C,38C are readily replaceable after significant wear.

It is also possible for the second resilient biasing elements 32C,34C,36C,38C to be enclosed by and extend within the telescopic components A,B of the second extensible sections 32,34,36,38. In such a case, chain links or other traction enhancing projections may be provided on the exterior of the telescopic components A,B.

The first resilient biasing elements 22C,24C,26C,28C are selected to have a lower spring constant than the second resilient biasing elements 32C,34C,36C,38C. As it is used here, spring constant is defined as the force per unit of displacement within the elastic range of the resilient biasing elements C.

A winch 60 is supported by the first and/or second support plate 40,42 and includes a cable drum 62 that can be operably turned on a cable drum axis 64 by a crank (not shown). According to a preferred embodiment of the present invention, cable drum axis 64 is coaxial with tire rotation axis 5 in order to improve inertial balance of the traction device 10 as it rotates with the tire 1. According to a preferred embodiment, the crank is removable to minimize the mass of the traction device 10.

The first end of each of a plurality of cables 66 are attached to cable drum 62 and extend radially outward within the telescopic components A,B of the first extensible sections 22,24,26,28. The second end of each of the plurality of cables 66 is secured with respect to a corresponding one of the fingers 52,54,56,58. Rotation of cable drum 62 by the crank causes cables 66 to be wound on cable drum 62, thereby contracting the first extensible sections 22,24,26,28 against the force of the first resilient biasing elements 22C,24C,26C,28C. Rotation of the cable drum 62 further causes contracting of the second extensible sections 32,34, 36,38 of the arms 12,14,16,18 against the force of second resilient biasing elements 32C,34C,36C,38C. As it is used here, cable is defined as any flexible element such as wire, rope, cord, chain, etc.

Inasmuch as the first resilient biasing elements 22C,24C, 26C,28C have a lower spring force than the second resilient biasing elements 32C,34C,36C,38C, the arms 12,14,16,18 are initially contracted along the first extensible sections 22,24,26,28, i.e., radially with respect to the tire tread 2, and are subsequently contracted along the second extensible sections 32,34,36,38, i.e., across the tire tread 2. That is to say, the traction device 10 is initially contracted to the diameter of the tire 1. When the second extensible sections 32,34,36,38 are drawn inward into engagement with the tread 2, radial contraction ceases. Thereafter, the traction device 10 is contracted to the width of the tire 1. When the fingers 52,54,56,58 are drawn into firm engagement with the inner sidewall 4 of the tire 1, width contraction ceases and the traction device 10 is securely held to the tire 1.

Optionally, one or more detents may be used between the components A,B of the second extensible sections 32,34,36, 38 to provide an initial resistance to contraction. Thus, the detents establish a minimum force the cables 66 must exert before the second extensible sections 32,34,36,38 begin contracting. This minimum force would not be exerted until the first extensible sections 22,24,26,28 are fully contracted.

A one-way ratchet mechanism 70 prevents loosening of the traction device 10 until a ratchet release lever 72 enables reverse rotation of the cable drum 62, i.e., to unwind the cables 66 under the influence of the first and second resilient biasing elements C. Additionally, a governor mechanism may be used to regulate the speed of reverse rotation.

In addition to regulating the sequence of contraction, the first and second resilient biasing elements C compensate for deflection of the sidewalls 3,4 as portions of the tire 1 bulge due to contact of the tread 2 with the terrain.

Further modifications envisioned within the scope of the appended claims include securing the ratchet release lever 72 with a key lock (not shown) to prevent unauthorized release of traction device 10 from the tire 1; including cable stops (not shown) to limit movement of the cables 66 thereby facilitating replacement of the second resilient biasing elements 32C,34C,36C,38C; including a mar resistant material on the sides of the support plates 20,22 confronting the tire 1 to prevent scuffing the wheel; including an anti-friction coating or lubricant at the interfaces between the components A,B of the first and second extensible sections 22,24,26,28,32,34,36,38; including an anti-friction coating or lubricant at the interfaces where the first and second resilient biasing elements C circumferentially touch the first and second extensible sections 22,24,26,28,32,34,36,38; and providing friction enhancing material at the interface between the fingers 52,54,56,58 and/or plates 53,55,57,59 with the sidewalls 3,4 of the tire 1.

Figure 4:
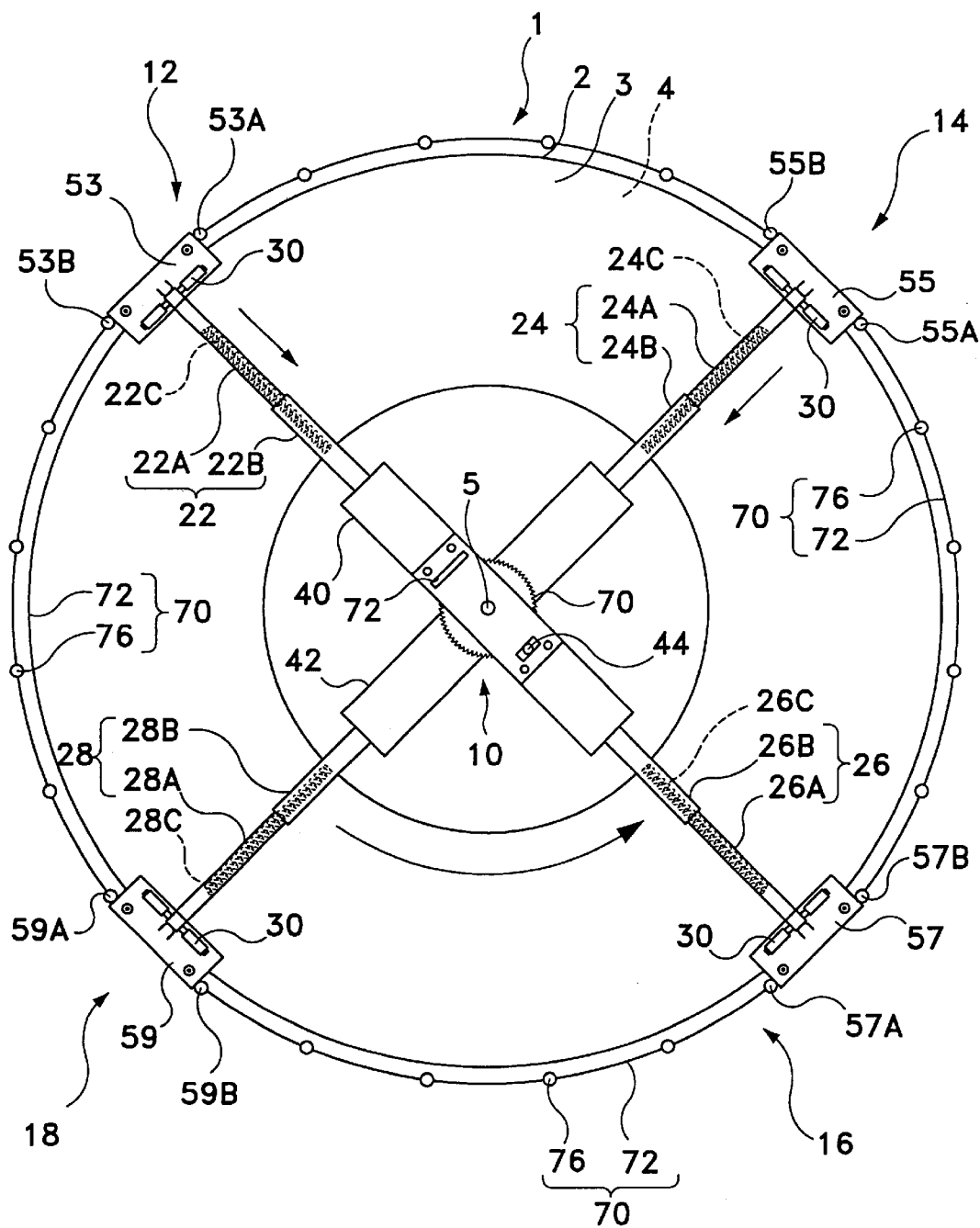
FIG. 4 is a front view similar to FIG. 2 showing a traction device according to a second preferred embodiment of the present invention.
Figure 5:
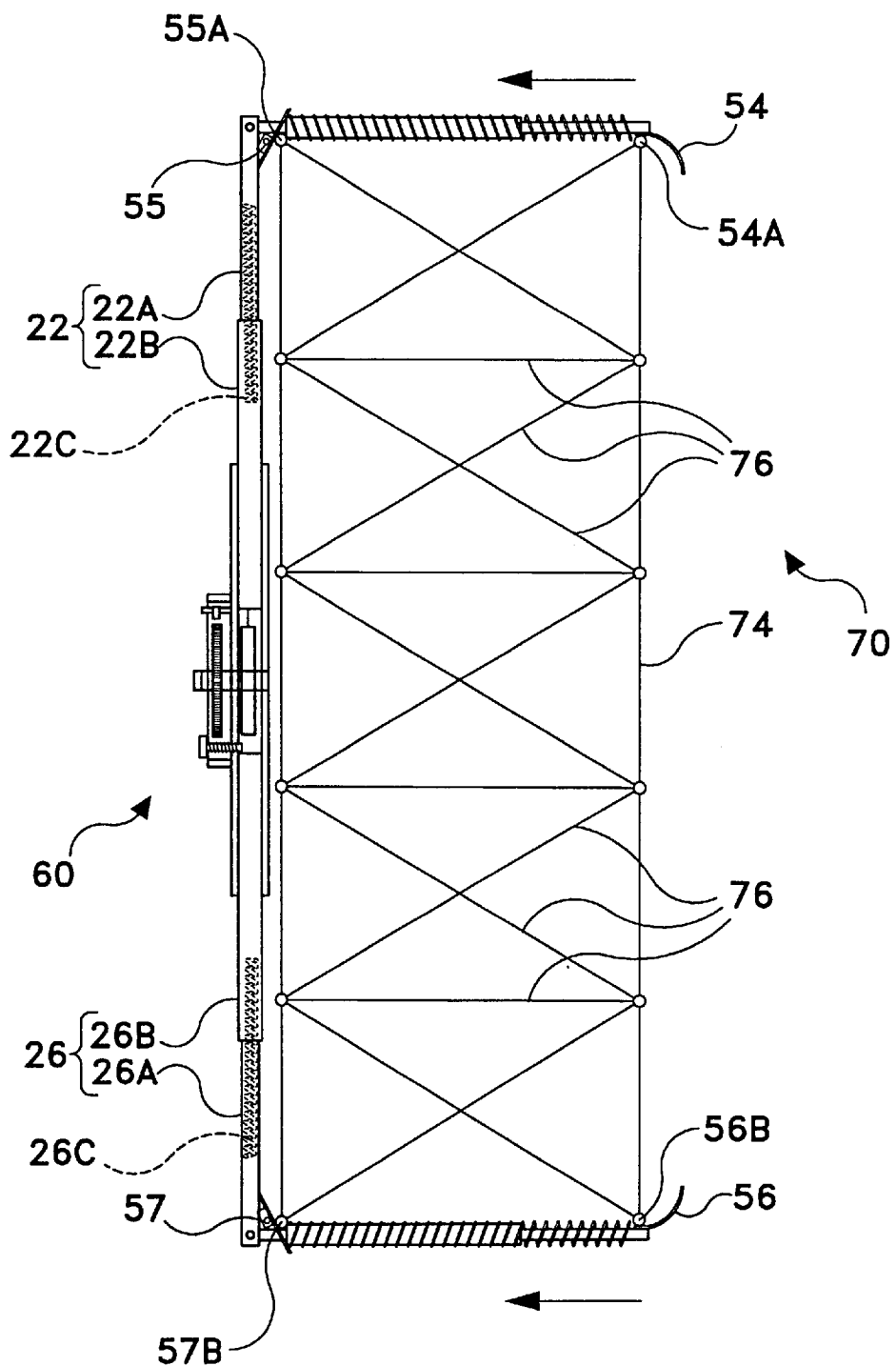
FIG. 5 is a side view of the traction device according to the second preferred embodiment of the present invention.

FIGS. 4 and 5 show a second preferred embodiment of the present invention wherein the preferred embodiment illustrated in FIGS. 1–3 is modified. Like reference numerals are used to designate like parts throughout the figures.

Each of the fingers 52,54,56,58 and the plates 53,55,57,59 include respective pairs of attachments A,B in FIGS. 4 and 5. Moreover, there may be a selection of additional possible attachments on each of the fingers 52,54,56,58 and the plates 53,55,57,59. The attachments may be configured as holes, rings, or any other arrangement suitable for connection to respective elongated members 70.

The elongated members 70 may include any flexible member capable of overlying the tire tread 2 between pairs of adjacent ones of the second extensible sections 32,34,36, 38. According to a most preferred embodiment of the present invention, the elongated members 70 are constructed of flexible metal wire, cable, or chain. Of course, additional materials and configurations are envisioned that are capable of extending between and being connected to the attachments, overlying a portion of the tire tread 2, and providing enhanced traction for the portions of the tire's circumference between the second extensible sections 32,34,36,38.

According to a most preferred embodiment of the present invention illustrated in FIG. 5, each elongated member 70 comprises a web of flexible members, e.g., metal cables, including a pair of side elements 72,74 extending circumferentially with respect to the tire 1 between pairs of adjacent ones of the second extensible sections 32,34,36,38. At least one traction element 76 connects the side elements 72,74 and overlays the tire tread 2 to enhance traction between the tread 2 and the terrain. The traction element(s) 76 may be fixed with respect to the side elements 72,74 or may be movably mounted with respect to the side elements 72,74.

It is envisioned that the elongated members 70 would be adjusted for different tire sizes by selecting an appropriate attachment 52A,52B,53A,53B,etc., or by changing the length of the elongated members 70, e.g., by resilient members or selecting a different length elongated member 70. According to a preferred embodiment of the present invention, the number of times a traction element 76 is wrapped around the side elements 72,74 would eliminate slack in all of the elongated members 70.

Of course, different configurations and combinations of elongated members 70 may be used. For example, a traction element 76 may be connected at a first end to an attachment on one of the fingers 52,54,56,58 and connected at a second end to an attachment on the plate 53,55,57,59 of an adjacent second extensible section 32,34,36,38. Thus, a single traction element 76 would extend diagonally across the surface of the tread 2 between a pair of adjacent second extensible sections 32,34,36,38.

Figure 6:
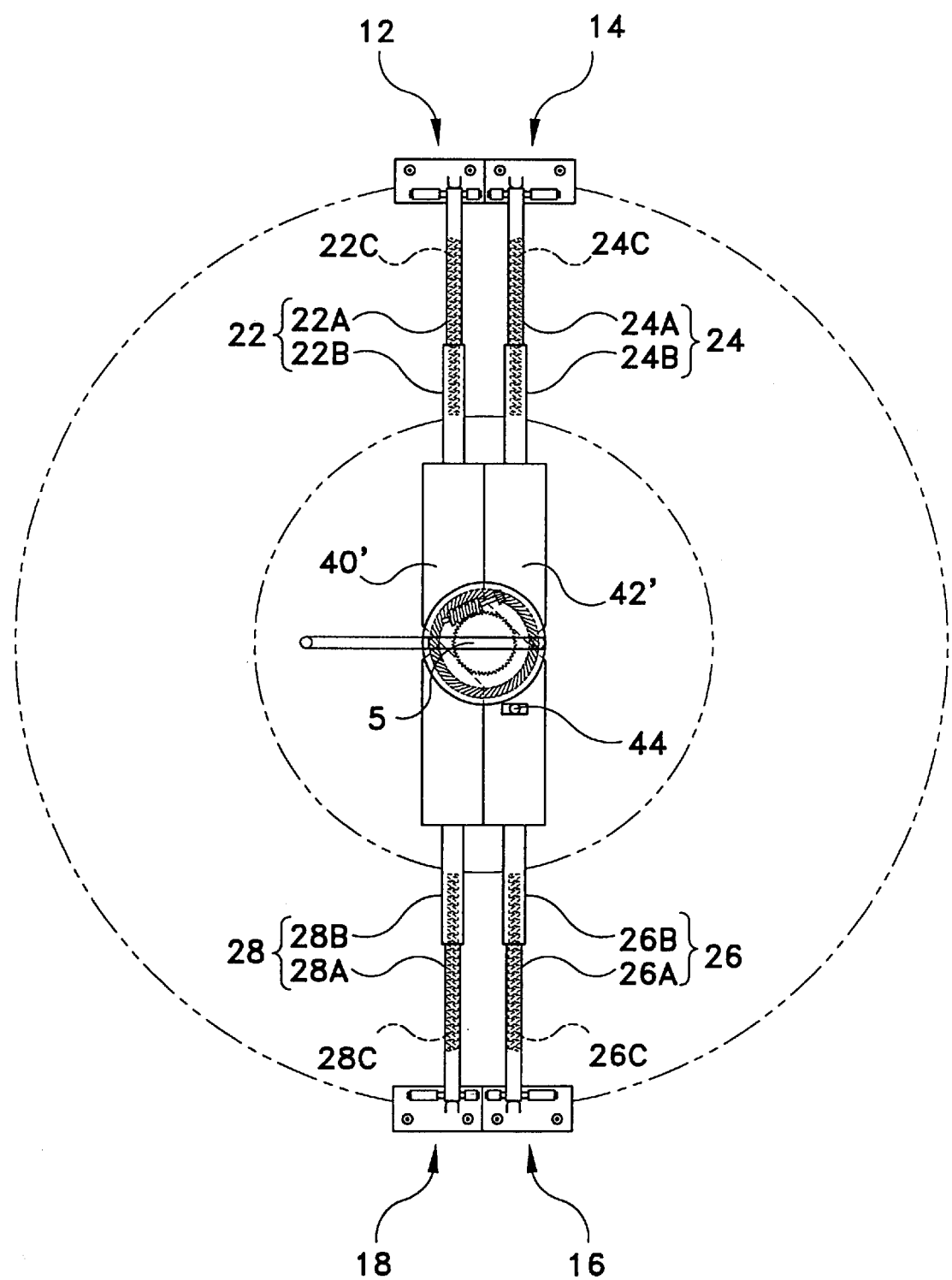
FIG. 6 is a front view of a traction device according to a third preferred embodiment of the present invention shown in a collapsed state.
Figure 7:
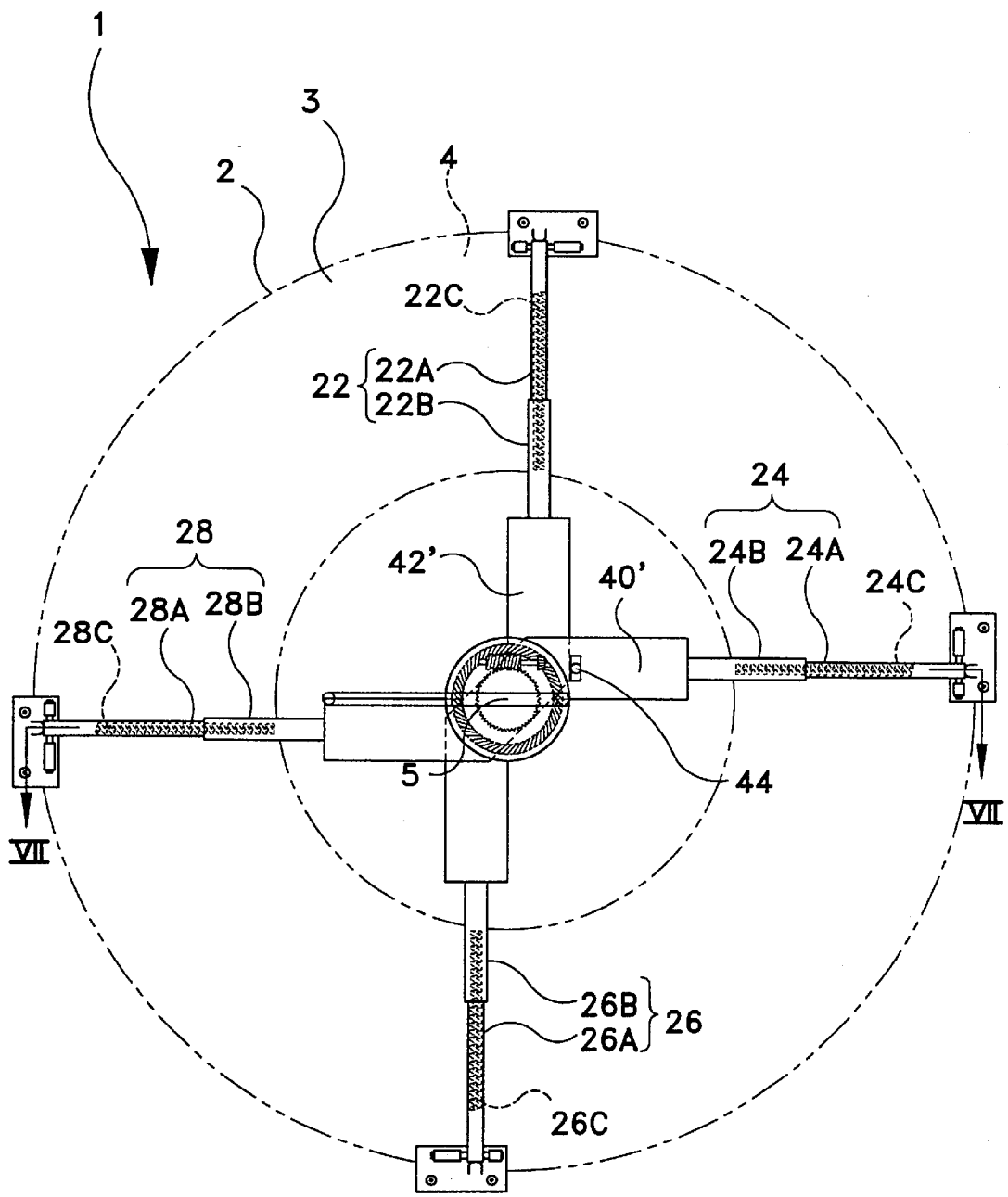
FIG. 7 is a front view of the traction device according to the third preferred embodiment of the present invention shown in an installed state.
Figure 8:
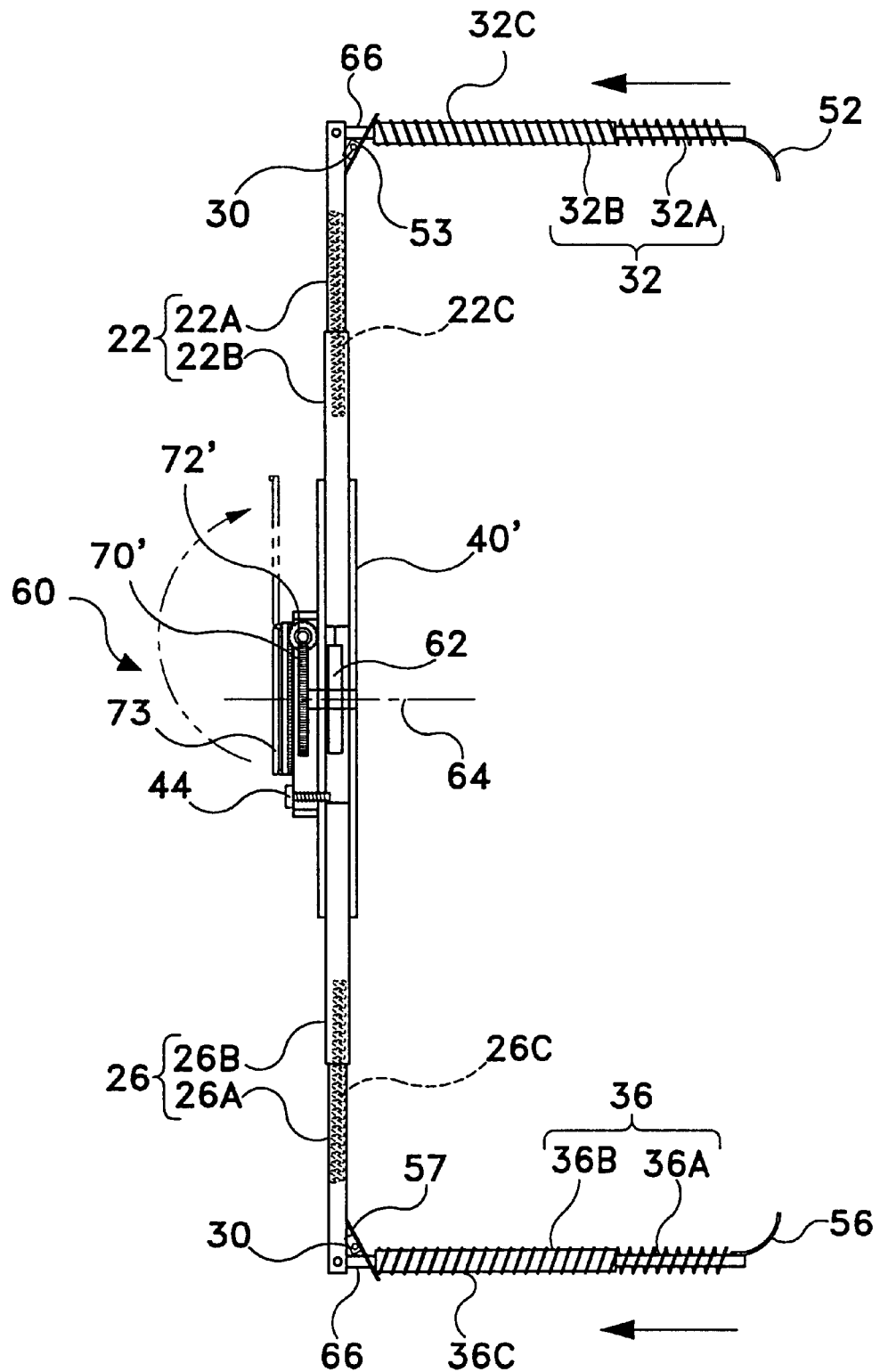
FIG. 8 is a cross-section view taken along line VIII—VIII in FIG. 7 of a traction device according to the third preferred embodiment of the present invention shown in an installed state.

FIGS. 6–8 show a third preferred embodiment of the present invention wherein the preferred embodiment illustrated in FIGS. 1–3 is modified. Again, like reference numerals are used to designate like parts throughout the figures.

According to the third preferred embodiment, the arms 12,16 are fixed at their radially proximal end to a first support plate 40', and the arms 14,18 are fixed at their radially proximal end to a second support plate 42'. First and second support plates 40',42' are relatively pivotal about a central point substantially coincident with the axis of rotation 5 for the tire 1. The first support plate 40' holds the arms 12,16 in a relatively parallel and offset relationship, and the second support plate 42' also holds the arms 16,18 in a relatively parallel and offset relationship. In the collapsed position of the traction device 10 (FIG. 6), first and second support plates 40',42' are relatively pivoted such that arms 12 and 18 aligned generally coaxially and parallel to arms 16 and 18, which are aligned generally coaxially with one another. According to such an arrangement, the collapsed position of the traction device can be made more compact. After positioning the traction device 10 with respect to tire 1, the first and second support plates 40',42' are relatively pivoted to equiangularly dispose the arms 12,14,16,18 around the tire rotation axis 5 (FIG. 7). A lock mechanism 44 maintains the relative position of the first and second support plates 40',42'.

According to another aspect of the present invention, third preferred embodiment also shows an arrangement whereby the actuator for the cable drum 62 includes gearing that resists back driving, e.g., worm type gearing, in place of providing a one-way ratchet mechanism. Referring to FIG. 8, a pinion 70' can be fixed for rotation with the cable drum 62 and can be operatively engaged by a worm 72'. Thus, rotation of the worm 72' can drive the pinion 70', and hence the cable drum 62, but the cable drum could not back-drive the worm 72' via the pinion 70'. Consequently, the traction device 10 can be contracted and expanded only in response to rotation of the worm.

In general, the worm 72' is rotated about an axis that can be oriented perpendicular to the axis of the pinion 70' and the cable drum 62. It is envisioned that additional gearing could be connected to the worm for reorienting the worm drive to an axis parallel to or coaxial with the axis of the pinion 70' and the cable drum 62. For example, the worm 72' can be driven via a face gear drive arrangement 73. It is also envisioned that other types of back-driving resistant gearing could be used, e.g., strain-wave gearing or planetary gearing presenting a high gear ratio. It is further envisioned that the operator handle for the input to the gearing could be made integrally with the gearing, thereby precluding a separate handle being misplaced.

The foregoing description with reference to the figures of certain embodiments of the present invention is for illustrative purposes only. Various changes and modifications may be made within the spirit and scope of the appended claims.

What is claimed is:

1. A traction device for attachment with respect to a tire rotating on an axis, the tire having a terrain-engaging surface connecting a pair of sidewalls, said traction device comprising:

a plurality of arms adapted to extend radially with respect to the axis, each of said plurality of arms including a first section adapted to be radially extensible with respect to terrain engaging surface and a second section adapted to be extendable across the terrain engaging surface, each of said plurality of second sections being mounted at a radially outward end of a corresponding one of said plurality of first sections;

a plurality of fingers adapted to engage one of the pair of sidewalls, each of said plurality of second sections extensibly connecting a corresponding one of said plurality of first sections and a corresponding one of said plurality of fingers;

a winch including a cable drum and a plurality of cables, each of said plurality of cables extending from a corresponding one of said plurality of fingers, along corresponding ones of said first and second sections, to said cable drum;

a plurality of first springs each expanding a corresponding one of said first sections;

a plurality of second springs each expanding a corresponding one of said second sections;

a hinge joint mounting each of said plurality of second sections at said radially outward end of said corresponding one of said plurality of first sections; and at least one detent resisting pivoting movement about each hinge joint;

wherein each of said first springs has a lower spring constant than a corresponding one of said plurality of second springs.

2. A traction device for attachment with respect to a tire rotating on an axis, the tire having a terrain-engaging surface connecting a pair of sidewalls, said traction device comprising:

a plurality of arms adapted to extend radially with respect to the axis, each of said plurality of arms including a first section adapted to be radially extensible with respect to terrain engaging surface and a second section adapted to be extendable across the terrain engaging surface, each of said plurality of second sections being mounted at a radially outward end of a corresponding one of said plurality of first sections;

a plurality of fingers adapted to engage one of the pair of sidewalls, each of said plurality of second sections extensibly connecting a corresponding one of said plurality of first sections and a corresponding one of said plurality of fingers;

a winch including a cable drum and a plurality of cables, each of said plurality of cables extending from a corresponding one of said plurality of fingers, along corresponding ones of said first and second sections, to said cable drum;

a plurality of first springs each expanding a corresponding one of said first sections;

a plurality of second springs each expanding a corresponding one of said second sections;

each of said second springs having a greater spring constant than a corresponding one of said plurality of first springs;

a first support plate fixed to at least a first one and a second one of said plurality of arms;

second support plate fixed to at least a third one of said plurality of arms, said first support plate and said second support plate being pivotal with respect to one another; and a lock for securing said first support plate with respect to said second support plate in a pivotal position wherein said plurality of arms are adapted to be equiangularly disposed around the axis;

wherein said first support plate fixes said first and second ones of said plurality of arms along a first pair of respective axes that are parallel and spaced from one another, said second support plate fixes said third and a fourth one of said plurality of arms along a second pair of respective axes that are parallel and spaced from one another.

3. A traction device for attachment with respect to a tire rotating on an axis, the tire having a terrain-engaging surface connecting a pair of sidewalls, said traction device comprising:

a plurality of arms adapted to extend radially with respect to the axis, each of said plurality of arms including a first section adapted to be radially extensible with respect to terrain engaging surface and a second section adapted to be extendable across the terrain engaging surface, each of said plurality of second sections being mounted at a radially outward end of a corresponding one of said plurality of first sections;

a plurality of fingers adapted to engage one of the pair of sidewalls, each of said plurality of second sections extensibly connecting a corresponding one of said plurality of first sections and a corresponding one of said plurality of fingers;

a winch including substantially nonreversible gearing, a cable drum, and a plurality of cables, each of said plurality of cables extending from a corresponding one of said plurality of fingers, along corresponding ones of said first and second sections, to said cable drum;

a plurality of first springs each expanding a corresponding one of said first sections;

a plurality of second springs each expanding a corresponding one of said second sections; and each of said second springs having a greater spring constant than a corresponding one of said plurality of first springs.

4. Said traction device according to claim 3, wherein said substantially nonreversible gearing includes a worm gear operatively engaging a mating pinion gear.

5. A traction device for attachment with respect to a tire rotating on an axis, the tire having a terrain-engaging surface connecting a pair of sidewalls, said traction device comprising:

a plurality of arms adapted to extend radially with respect to the axis, each of said plurality of arms including a first section adapted to be radially extensible with respect to terrain engaging surface and a second section adapted to be extendable across the terrain engaging surface, each of said plurality of second sections being mounted at a radially outward end of a corresponding one of said plurality of first sections;

a plurality of fingers adapted to engage one of the pair of sidewalls, each of said plurality of second sections extensibly connecting a corresponding one of said plurality of first sections and a corresponding one of said plurality of fingers;

a winch including a cable drum and a plurality of cables, each of said plurality of cables extending from a corresponding one of said plurality of fingers, along corresponding ones of said first and second sections, to said cable drum; and a plurality of first springs each expanding a corresponding one of said first sections;

a plurality of second springs each expanding a corresponding one of said second sections;

each of said second springs having a greater spring constant than a corresponding one of said plurality of first springs; and a plurality of traction elements adapted for overlying the terrain engaging surface, each of said plurality of traction elements being connected between a pair of adjacent ones of said second sections.

* * * * *